United States Patent
Pemberton-Pigott

(10) Patent No.: US 9,513,737 B2
(45) Date of Patent: Dec. 6, 2016

(54) TOUCH-SENSITIVE DISPLAY WITH OPTICAL SENSOR AND METHOD

(75) Inventor: Nigel Patrick Pemberton-Pigott, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1205 days.

(21) Appl. No.: 12/884,936

(22) Filed: Sep. 17, 2010

(65) Prior Publication Data

US 2012/0068971 A1  Mar. 22, 2012

(51) Int. Cl.
*G06F 3/042* (2006.01)
*G06F 3/041* (2006.01)
*G06F 3/01* (2006.01)

(52) U.S. Cl.
CPC ............ *G06F 3/0416* (2013.01); *G06F 3/016* (2013.01); *G06F 2203/04105* (2013.01)

(58) Field of Classification Search
CPC ...................................................... G06F 3/042
USPC ................................................ 345/173–179
See application file for complete search history.

(56) References Cited

U.S. PATENT DOCUMENTS

| 3,410,956 | A | 11/1968 | Grossimon et al. |
|---|---|---|---|
| 3,673,327 | A | 6/1972 | Johnson et al. |
| 4,198,623 | A | 4/1980 | Misek et al. |
| 4,281,245 | A | 7/1981 | Brogardh et al. |
| 4,346,376 | A | 8/1982 | Mallos |
| 4,484,179 | A | 11/1984 | Kasday |
| 4,553,842 | A | 11/1985 | Griffin |
| 4,593,191 | A | 6/1986 | Alles |
| 4,599,908 | A | 7/1986 | Sheridan et al. |
| 4,607,158 | A | 8/1986 | Ovren |
| 4,609,816 | A | 9/1986 | Severin |
| 4,701,614 | A | 10/1987 | Jaeger et al. |
| 4,710,760 | A | 12/1987 | Kasday |
| 4,717,253 | A | 1/1988 | Pratt, Jr. |
| 4,733,068 | A | 3/1988 | Thiele et al. |
| 4,880,972 | A | 11/1989 | Brogardh et al. |
| 4,885,663 | A | 12/1989 | Parker |
| 4,915,473 | A | 4/1990 | Haese et al. |
| 4,933,544 | A | 6/1990 | Tamaru |
| 4,963,859 | A | 10/1990 | Parks |

(Continued)

FOREIGN PATENT DOCUMENTS

| DE | 102004042693.5 | 3/2009 |
|---|---|---|
| EP | 0377549 | 1/1989 |

(Continued)

OTHER PUBLICATIONS

Dr. Rudiger Paschotta, Distance Measurements With Lasers, Encyclopedia of Lasers and Technology, Last Updated Jun. 22, 2009, Retrieved From [URL: http://www.rp-photonics.com/distance_measurements_with_lasers.html] on Jul. 21, 2009, 3 Pages.

(Continued)

*Primary Examiner* — Michael Faragalla
*Assistant Examiner* — Scott Au
(74) *Attorney, Agent, or Firm* — Fish & Richardson P.C.

(57) ABSTRACT

An electronic device includes a touch-sensitive display and a sensor configured to detect a force that results in depression of the touch-sensitive display. The sensor includes an optical device that receives a reflection of an optical signal, wherein the force affects the reflection.

16 Claims, 6 Drawing Sheets

(56) References Cited

U.S. PATENT DOCUMENTS

| | | |
|---|---|---|
| 5,001,306 A | 3/1991 | Purcell |
| 5,004,913 A | 4/1991 | Kleinerman |
| 5,118,931 A | 6/1992 | Udd et al. |
| 5,153,386 A | 10/1992 | Siefer et al. |
| 5,222,810 A | 6/1993 | Kleinerman |
| 5,363,463 A | 11/1994 | Kleinerman |
| 5,399,854 A | 3/1995 | Dunphy et al. |
| 5,812,251 A | 9/1998 | Manesh |
| 5,914,709 A | 6/1999 | Graham et al. |
| 6,137,573 A | 10/2000 | Luke et al. |
| 6,172,665 B1 | 1/2001 | Bullister |
| 6,172,667 B1 | 1/2001 | Sayag |
| 6,492,979 B1 | 12/2002 | Kent et al. |
| 6,504,530 B1 | 1/2003 | Wilson et al. |
| 6,538,644 B1 | 3/2003 | Muraoka |
| 6,788,295 B1 | 9/2004 | Inkster |
| 6,927,384 B2 | 8/2005 | Reime et al. |
| 7,027,672 B2 | 4/2006 | Tjin |
| 7,202,856 B2 | 4/2007 | Cok |
| 7,202,860 B2 | 4/2007 | Ogawa |
| 7,230,608 B2 | 6/2007 | Cok |
| 7,333,094 B2 | 2/2008 | Lieberman et al. |
| 7,376,523 B2 | 5/2008 | Sullivan et al. |
| 7,444,887 B2 | 11/2008 | Yoshida et al. |
| 7,466,879 B2 | 12/2008 | Tjin |
| 7,479,903 B2 | 1/2009 | Otsuka et al. |
| 7,586,479 B2 | 9/2009 | Park et al. |
| 7,705,824 B2 | 4/2010 | Baucom et al. |
| 8,102,378 B2 | 1/2012 | Chung et al. |
| 8,224,258 B2 | 7/2012 | Jeon et al. |
| 8,284,164 B2 * | 10/2012 | Han .............................. 345/173 |
| 8,384,693 B2 * | 2/2013 | Newton ........................ 345/175 |
| 2003/0026971 A1 | 2/2003 | Inkster et al. |
| 2003/0079549 A1 | 5/2003 | Lokhorst et al. |
| 2004/0233158 A1 | 11/2004 | Stavely et al. |
| 2006/0289284 A1 | 12/2006 | Han |
| 2007/0025805 A1 | 2/2007 | Lapstun et al. |
| 2007/0288194 A1 | 12/2007 | Boillot |
| 2008/0007542 A1 | 1/2008 | Eliasson et al. |
| 2008/0018612 A1 | 1/2008 | Nakamura et al. |
| 2008/0055494 A1 | 3/2008 | Cernasov |
| 2008/0121442 A1 | 5/2008 | Boer et al. |
| 2008/0252618 A1 | 10/2008 | Chung et al. |
| 2008/0266273 A1 | 10/2008 | Slobodin et al. |
| 2008/0278461 A1 | 11/2008 | Prat et al. |
| 2008/0309632 A1 | 12/2008 | Westerman et al. |
| 2009/0058832 A1 | 3/2009 | Newton |
| 2009/0140989 A1 | 6/2009 | Ahlgren |
| 2009/0237374 A1 | 9/2009 | Li et al. |
| 2009/0244026 A1 | 10/2009 | Purdy et al. |
| 2010/0093402 A1 | 4/2010 | Jeon et al. |
| 2010/0103140 A1 * | 4/2010 | Hansson ........................ 345/175 |
| 2010/0156844 A1 | 6/2010 | Paleczny et al. |
| 2010/0188367 A1 | 7/2010 | Nagafuji et al. |
| 2010/0197352 A1 | 8/2010 | Runstedler et al. |
| 2010/0220245 A1 | 9/2010 | Yang |
| 2010/0265188 A1 | 10/2010 | Chang et al. |
| 2010/0271334 A1 | 10/2010 | Yuan |
| 2010/0277431 A1 | 11/2010 | Klinghult |
| 2010/0302210 A1 * | 12/2010 | Han ...................... G06F 3/0412 345/175 |
| 2011/0037721 A1 | 2/2011 | Cranfill et al. |
| 2011/0037729 A1 | 2/2011 | Cho et al. |
| 2011/0050617 A1 | 3/2011 | Murphy et al. |
| 2011/0147973 A1 | 6/2011 | Sung et al. |
| 2011/0179368 A1 | 7/2011 | King et al. |
| 2011/0234535 A1 | 9/2011 | Hung et al. |
| 2012/0068939 A1 | 3/2012 | Pemberton-Pigott |
| 2012/0068970 A1 * | 3/2012 | Pemberton-Pigott ......... 345/175 |
| 2012/0071206 A1 * | 3/2012 | Pemberton-Pigott ......... 455/566 |
| 2012/0262408 A1 | 10/2012 | Pasquero et al. |

FOREIGN PATENT DOCUMENTS

| | | |
|---|---|---|
| EP | 0392897 | 10/1990 |
| EP | 1610210 | 12/2005 |
| EP | 2034287 | 3/2009 |
| EP | 2101251 | 9/2009 |
| EP | 2105824 | 9/2009 |
| EP | 2224325 | 9/2010 |
| JP | 63184823 | 7/1987 |
| JP | 63184823 | 7/1988 |
| JP | 09-237158 | 9/1997 |
| KR | 102005117464 | 12/2005 |
| WO | 9904234 | 1/1999 |
| WO | 0073982 | 12/2000 |
| WO | 2006133018 | 12/2006 |
| WO | 2007129085 | 11/2007 |
| WO | 2008101657 | 8/2008 |
| WO | 2010049823 | 5/2010 |
| WO | 2010055195 | 5/2010 |

OTHER PUBLICATIONS

Wikipedia, Laser Extensometer, Last Modified May 13, 2009, Retrieved From [URL: http://en.wikipedia.org/wiki/laser_extensometer] on Jul. 21, 2009, 1 Page.

Shida K. Wang Xin, Optical Mouse Sensor for Detecting Height Variation and Translation of a Surface, Apr. 1, 2008, Industrial Technology Issue 21-24, 1 Page.

Welcome to Metralight, Jul. 21, 2009, Retrieved From [URL: http://www.metralight.com ] on Jul. 21, 2009, 1 Page.

International Searching Authority, International Search Report and Written Opinion issued in PCT/CA2011/001038, mailed Dec. 21, 2011, 11 pages.

Giallorenzi et al.; "Optical Fiber Sensor Technology", IEEE Journal of Quantum Electronics, vol. QU-18, No. 4, Apr. 1982, 40 Pages (626-665).

Extended Eupropean Search Report and European Search Opinion issued in connection with international application No. 10177446. 1-2224 on Feb. 22, 2011.

Extended Eupropean Search Report and European Search Opinion issued in connection with international application No. 10177436.2 on Feb. 22, 2011.

Lau, K.S., et al., Force Measurement by Visibility Modulated Fiber Optic Sensor, Optics Info Base Applied Optics, vol. 38, Issue 34, Dec. 1, 1999, 3 pages.

Vartech Systems Inc., Industrial Displays and Computer Solutions, internet article, http://www.vartechsystems.com/about/, retrieved from the internet on Jul. 21, 2009, 2 pages.

Walker, Geoff, Circular Polarizers in Resistive Touch Screens, Veritas et Visus, Aug. 2006, 5 pages.

J. Limeres et al., Analysis of a novel stress-sensing technique based on light scattering by an array of birefringent optical waveguides, Journal of Optics A: Pure and Applied Optics, Sep. 2003, 2 pages.

Next Window Optical Touch, Next Window's Optical Touch Screen Technology, internet article, http://www.nextwindow.com/benefits/touchscreen_technology.html, copyright date 2008, 2 pages.

Kreuzer, Manfred, Strain Measurement with Fiber Bragg Grating Sensors, HBM GmbH, http://www.hbm.com/fileadmin/mediapool/techarticles/2007/FBGS_StrainMeasurement_en.pdf, 2007, 9 pages.

Liu, Yunqi, et al., Fiber-Bragg-gratings force sensor based on a wavelength-switched self-seeded Fabry-Pe'rot laser diode, Photonics Technology Letters, IEEE, vol. 17, Issue 2, Feb. 2005, 1 page.

Chenyang Technologies GMBH & Co. KG, Fiber Optic Bragg-Grating Sensors, http://www.chenyang-ism.com/Bragg-Grating. htm, retrieved from the internet on Jul. 21, 2009, 2 pages.

Bakalidis, G.N. et al., A Low-cost Fiber Optic Force Sensor, IEEE Transactions on Instrumentation and Measurement, vol. 45, No. 1, Feb. 1996, 4 pages.

Nuckley, David J. et al., Developement of a Fiber-Ooptic Force Sensing Glove to Provide Clinical Biomechanics Measurements, 2008, 2 pages.

(56) References Cited

OTHER PUBLICATIONS

The European Patent Office., "Partial European Search Report," for European patent application No. 11162722.0, issued on Sep. 5, 2011, 7 pages.
Inside Blackberry, The Official BlackBerry Blog, "Inside the Trackpad: a Blackberry Science Lesson," Dec. 18, 2009, retrieved from the internet on Dec. 29, 2010, 12 pages.
Hodges et al., "ThinSight: Versatile Multi-touch Sensing for Thin Form-factor Displays," Microsoft Research Cambridge, ACM UIST, Oct. 7-10, 2007, 10 Pages.
European Patent Office, "Extended European Search Report," issued in connection with European Application No. 11162722.0, on Dec. 23, 2011, 16 pages.
European Patent Office, "Communication Pursuant to Article 94(3) EPC," issued in connection with European Application No. 11162722.0, on Nov. 5, 2012, 8 pages.
Christopher et al., "Touch Screen With Combined Force and Position Sensing," IP.com Journal, ip.com Inc., Jun. 1, 1989, XP013027734 (2 pages).
European Patent Office, "Extended European Search Report," for European Patent Application No. 08153461.2, dated Jun. 5, 2008 (6 pages).
Korean Intellectual Property Office, Office Action, for Korean Patent Application No. 10-2009-0024398 dated Sep. 28, 2010 (10 pages).
United States Patent and Trademark Office, Non-Final Office Action, issued in connection with U.S. Appl. No. 13/087,984, on Dec. 19, 2012, 39 pages.
United States Patent and Trademark Office, Final Office Action, issued in connection with U.S. Appl. No. 13/087,984, on Aug. 7, 2013, 35 pages.
United States Patent and Trademark Office, "Non-Final Office Action," issued in connection with U.S. Appl. No. 12/884,942, on Feb. 19, 2014, 37 pages.
United States Patent and Trademark Office, "Advisory Action," issued in connection with U.S. Appl. No. 13/087,984, on Oct. 23, 2013, 4 pages.
European Patent Office, "Communication Pursuant to Article 94(3) EPC," issued in connection with application No. EP 10177446.1, on Jun. 6, 2014, 7 pages.
European Patent Office, "Communication Pursuant to Article 94(3) EPC," issued in connection with application No. EP 10177436.2, on Jun. 6, 2014, 6 pages.
United States Patent and Trademark Office, "Final Office Action," issued in connection with U.S. Appl. No. 12/884,942, dated Sep. 11, 2014, 34 pages.
Canadian Intellectual Property Office, "Office Action," issued in connection with CA Application No. 2,811,441, dated Jan. 15, 2015, 5 pages.
International Searching Authority, International Search Report and Written Opinion issued in PCT/CA2011/001039, mailed on Dec. 19, 2011, 12 pages.
International Searching Authority, International Search Report and Written Opinion issued in PCT/CA2011/001040, mailed on Dec. 21, 2011, 9 pages.
International Preliminary Report on Patentability in International Application No. PCT/CA2011/001039, dated Mar. 28, 2013, 8 pages.
International Preliminary Report on Patentability in International Application No. PCT/CA2011/001040, dated Mar. 28, 2013, 7 pages.
International Preliminary Report on Patentability in International Application No. PCT/CA2011/001038, dated Mar. 28, 2013, 9 pages.
Office Action in CA Application No. 2,811,445, dated Oct. 9, 2014, 8 pages.
Office Action in CA Application No. 2,811,321, dated Oct. 9, 2014, 4 pages.
Office Action in CA Application No. 2,774,358, dated Nov. 21, 2013, 4 pages.
EPO, "Extended Search Report," issued in connection with corresponding EP Application No. 10177455.2, mailed on Feb. 25, 2011, 12 pages.
EPO, "Extended Search Report," issued in connection with counterpart EP Application No. 10177449.5, mailed on Feb. 23, 2011, 10 pages.
Communication pursuant to Article 94(3) EPC in EP Application No. 10177449.5, dated Sep. 3, 2014, 8 pages.
The United States Patent and Trademark Office, Office Action issued in connection with U.S. Appl. No. 12/884,611, dated Dec. 24, 2013, 39 pages.
The United States Patent and Trademark Office, Office action issued in connection with U.S. Appl. No. 12/884,630, dated Feb. 14, 2014, 46 pages.
The United States Patent and Trademark Office, Office action issued in connection with U.S. Appl. No. 12/884,630, dated Aug. 14, 2014, 15 pages.
The United States Patent and Trademark Office, Advisory action issued in connection with U.S. Appl. No. 12/884,630, dated Nov. 20, 2014, 4 pages.
The United States Patent and Trademark Office, Office action issued in connection with U.S. Appl. No. 12/884,630, dated Jan. 26, 2015, 30 pages.
The United States Patent and Trademark Office, Office Action issued in connection with U.S. Appl. No. 12/884,611, dated Jul. 3, 2014, 22 pages.
The United States Patent and Trademark Office, Advisory Action issued in connection with U.S. Appl. No. 12/884,611, dated Sep. 17, 2014, 3 pages.
United States Patent and Trademark Office, Office Action issued in connection with U.S. Appl. No. 13/087,984 on Aug. 7, 2013, 35 pages.
Office Action issued in Canadian Application No. 2,811,445 on Mar. 23, 2016.
Office Action issued in Canadian Application No. 2,811,441 on Mar. 23, 2016.

\* cited by examiner

TOUCH-SENSITIVE DISPLAY WITH OPTICAL SENSOR AND METHOD

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablet computer, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
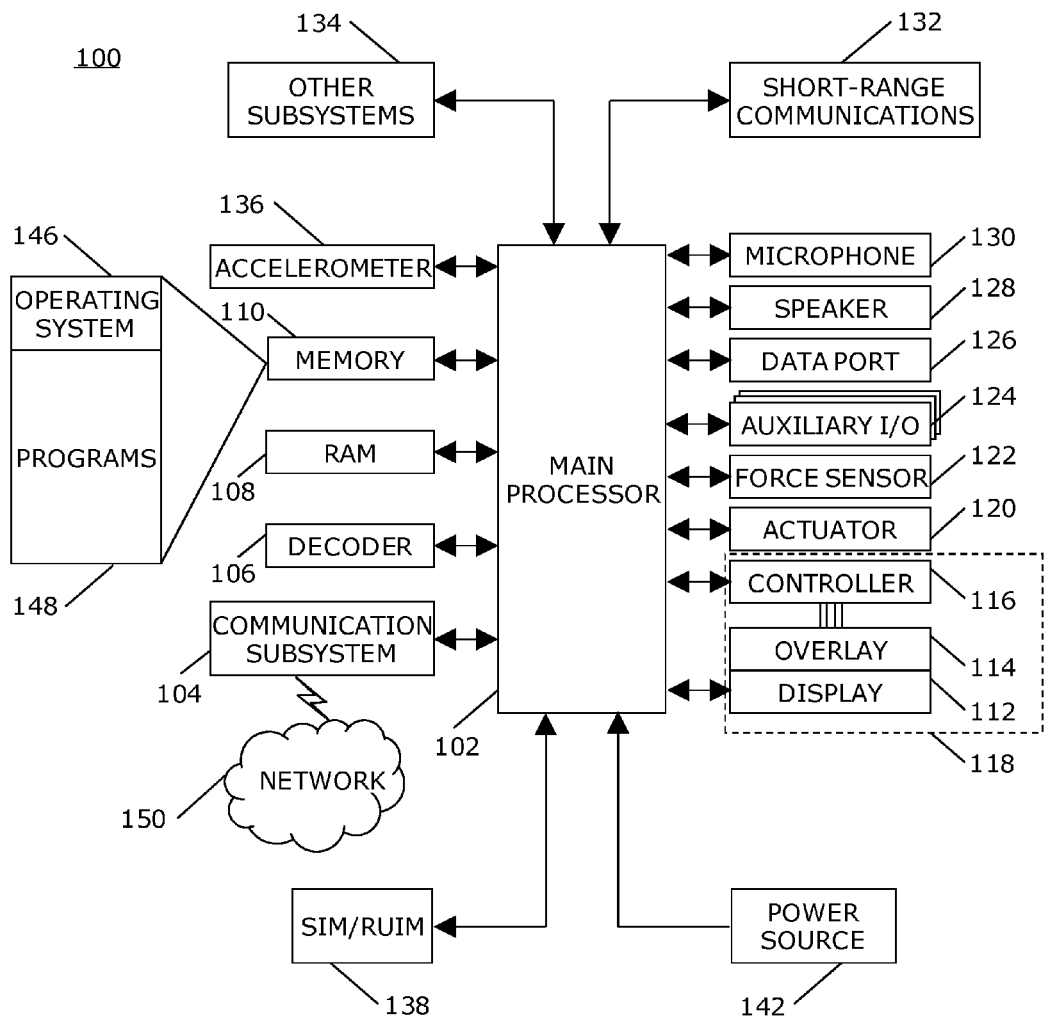
FIG. 1 is a block diagram of a portable electronic device in accordance with the disclosure.

The following describes apparatus for and method of detecting depression of, or force exerted on, a touch-sensitive display of, for example, an electronic device. When depression of a movable touch-sensitive display is detected, selection or confirmation of a selection occurs, and an associated function is performed.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). The overlay 114 may comprise one or more materials such as glass, plastic, polymer, and so forth. The touch-sensitive display 118 displays information using one or more of light emitting diodes, organic light emitting diodes, liquid crystal displays, thin film transistor liquid crystal displays, plasma displays, cathode ray tube displays, and so forth.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The optional actuator(s) 120 may be depressed by applying sufficient force to the touch-sensitive display 118 to overcome the actuation force of the actuator 120. Force as utilized throughout the specification refers to force measurements, estimates, and/or calculations, such as pressure, deformation, stress, strain, force density, force-area relationships, thrust, torque, and other effects that include force or related quantities. The actuator 120 may be actuated by pressing anywhere on the touch-sensitive display 118. The actuator 120 may provide input to the processor 102 when actuated. Actuation of the actuator 120 may result in provision of tactile feedback. When force is applied, the touch-sensitive display 118 is depressible, pivotable, and/or movable. The actuator may be any suitable actuator, including mechanical and/or electrical actuators.

Figure 2:
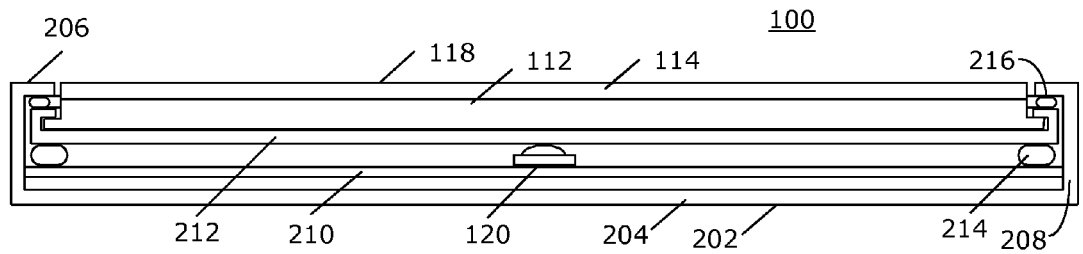
FIG. 2 is a sectional side view of a portable electronic device with a mechanical actuator in accordance with the disclosure.

A sectional side view of a portable electronic device 100 with a mechanical actuator 120 is shown in FIG. 2. The cross section is taken through the center of the actuator 120. The portable electronic device 100 includes a housing 202 that encloses components such as shown in FIG. 1. The housing 202 may include a back 204, a frame 206, and sidewalls 208 that extend between the back 204 and the frame 206. A base 210 extends between the sidewalls 208, generally parallel to the back 204, and supports the actuator 120. In the example of FIG. 2, a mechanical dome switch actuator is utilized. The touch-sensitive display 118 may be supported on a support tray 212 of suitable material, such as magnesium, and the support tray 212 may be biased away from the base 210 toward the frame 206 by biasing elements 214, such as gel pads or springs, between the support tray 212 and the base 210. Compliant or compressible spacers 216, which may be, for example, gel pads or springs, may be located between the support tray 212 and the frame 206. The support tray 212 may be flexible. For purposes of this specification, the support tray 212 may be considered to be part of the touch-sensitive display 118, and optical signals may be emitted toward and reflected by the support tray 212. Optionally, the optical signals may be emitted toward openings in the support tray 212 through which a surface of the display 112 or other part of the touch-sensitive display 118 is visible.

Figure 3:
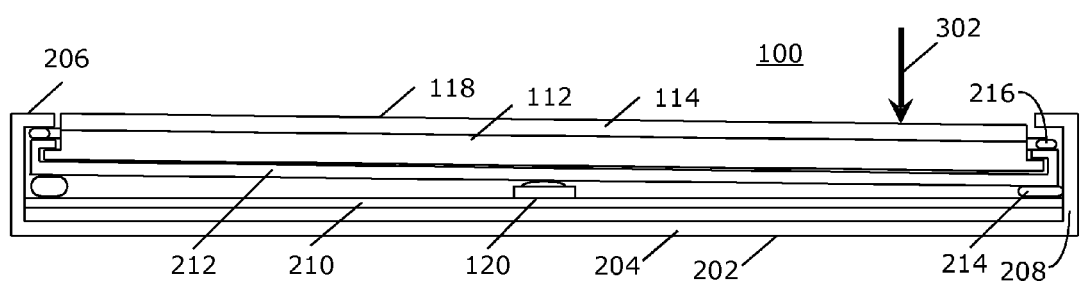
FIG. 3 is a sectional side view of a portable electronic device with a depressed mechanical actuator in accordance with the disclosure.

The touch-sensitive display 118 may be moveable and depressible with respect to the housing 202, and in this example is shown floating with respect to the housing 202, i.e., not fastened to the housing 202. As the touch-sensitive display 118 is moved toward the base 210, the biasing elements 214 are compressed, and when sufficient force is applied, the actuator 120 is depressed or actuated as shown in FIG. 3. The touch-sensitive display 118 may also pivot within the housing to depress the actuator 120. A force 302 applied to one side of the touch-sensitive display 118 moves the display 118 toward the base 210, causing compression of the biasing elements 214 on that side of the touch-sensitive display 118 and depressing the actuator 120. The actuator 120 may be actuated by pressing anywhere on the touch-sensitive display 118. The processor 102 receives a signal when the actuator 120 is depressed or actuated, which signal may trigger a selection or other input to the portable electronic device 100. For a mechanical dome switch/actuator, tactile feedback is provided when the dome collapses due to imparted force and when the dome switch/actuator returns to the rest position after release of the switch. Although a single actuator is shown, any suitable number of actuators may be utilized and may be located in any suitable position(s).

Figure 4:
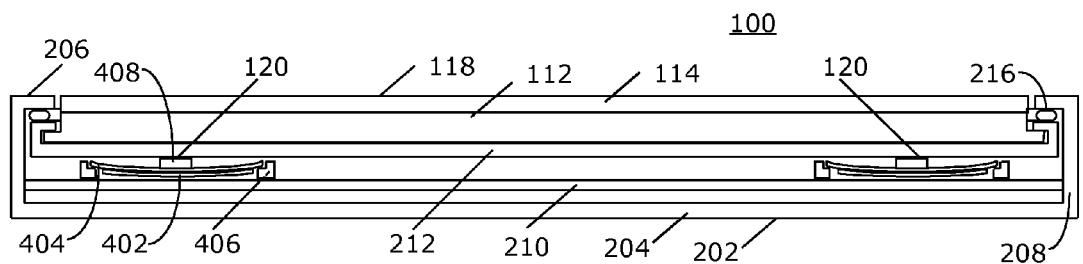
FIG. 4 is a sectional side view of a portable electronic device with piezoelectric actuators in accordance with the disclosure.

A sectional side view of a portable electronic device with piezoelectric (piezo) actuators is shown in FIG. 4. The actuator 120 may comprise one or more piezo devices 402 that provide tactile feedback for the touch-sensitive display 118. Four piezo devices 402 are utilized in this example, one disposed near each corner of the device 100. The cross-section of FIG. 4 is taken through the centers of two of the four piezo devices 402 utilized in this example. The piezo devices 402 may be disposed between the base 210 and the support tray 212. Each piezo actuator 120 includes a piezoelectric device, such as a piezoelectric ceramic disk 402 adhered to a substrate 404. The substrate 404 is elastically deformable, and may be comprised of metal, such that the substrate 404 bends when the piezo device 402 contracts, e.g., diametrically. The piezo device 402 may contract, for example, as a result of build-up of charge/voltage at the piezo device 402 or in response to a force, such as an external force applied to the touch-sensitive display 118. Each substrate 404 and piezo device 402 may be suspended from a support, such as a ring-shaped frame 406, for supporting the piezo device 402 while permitting flexing of the piezo actuator 120 as shown in FIG. 4. The support rings 406 may be disposed on the base 210 or may be part of the base 210, which may be a printed circuit board in a fixed relation to at least a part of the housing 202. Optionally, the substrate 404 may be mounted on a flat surface, such as the base 210. An element 408, which may be comprised of a suitable material such as a hard rubber, silicone, polyester, and/or polycarbonate, may be disposed between the piezo actuator 402 and the touch-sensitive display 118. This element 408 may provide a bumper or cushion for the piezo actuator 120 as well as facilitate actuation of the piezo actuator and/or one or more force sensors 122 that may be disposed between the piezo actuators 120 and the touch-sensitive display 118. The element 408 does not substantially affect the tactile feedback provided to the touch-sensitive display 118. As the touch-sensitive display 118 is moved toward the base 210, when sufficient force is applied, the actuator 120 of FIG. 4 is depressed or actuated. The processor 102 receives a signal when the actuator 120 is depressed or actuated, which signal may trigger a selection of a displayed selection option or other input to the portable electronic device 100 and optionally provide tactile feedback. As described below, a depression sensor, also referred to as an optical depression sensor, comprising one or more optical devices may alternatively or additionally provide the signal that triggers selection of a displayed selection option or other input to the electronic device 100, and may optionally trigger provision of tactile feedback by the piezo actuators 120.

Contraction of the piezo actuators 120 applies a spring-like force, for example, opposing a force externally applied to the touch-sensitive display 118 or providing tactile feedback in response to another event, such as an incoming call or other situation that results in provision of tactile feedback. The charge/voltage may be adjusted by varying the applied voltage or current, thereby controlling the force applied by the piezo devices 402. The charge/voltage across the piezo actuator 120 may be removed or reduced, for example, by a controlled discharge current that causes the piezo device 402 to expand, releasing or decreasing the force applied by the piezo device 402. The charge/voltage may advantageously be reduced over a relatively short period of time to provide tactile feedback to the user via the touch-sensitive display 118. Absent an external force and absent a charge/voltage across the piezo device 402, the piezo device 402 may be slightly bent due to a mechanical preload.

The processor 102, or a separate processor or controller, may be operably coupled to one or more drivers that control the voltage/current/charge across the piezo devices 402, which controls the force applied by the piezo actuators 120 on the touch-sensitive display 118. Each of the piezoelectric devices 402 may be controlled substantially equally and concurrently. Optionally, the piezoelectric devices 402 may be controlled separately. The piezo actuators 120 may be controlled to impart a force on the touch-sensitive display as tactile feedback, for example, to simulate collapse or release of a dome switch. The piezo actuators 120 may be controlled to provide other tactile feedback, for example, a vibration to notify of an incoming call or text message.

Force information related to a detected touch on the touch-sensitive display 118 may be utilized to highlight or select information, such as information associated with a location of a touch, e.g., displayed selection options. For example, a touch that does not meet a force threshold may highlight a selection option, whereas a touch that meets a force threshold may select or input that selection option. Meeting the force threshold also includes exceeding the force threshold. Selection options include, for example, displayed or virtual keys of a keyboard; selection boxes or windows, e.g., "cancel," "delete," or "unlock"; function buttons, such as play or stop on a music player; menu items, and so forth. Different magnitudes of force may be associated with different functions or input. For example, a lesser force may result in panning, and a higher force may result in zooming.

When a force that meets the force threshold is imparted or exerted on the touch-sensitive display 118, depression occurs. A force that meets the force threshold equals or exceeds the force threshold. Depression of the touch sensitive display 118 signifies selection, also referred to as confirmation of selection, of a selection option displayed on the touch-sensitive display 118. The selection option is typically associated with a touch location. Tactile feedback by an actuator 120 or other mechanism, visual feedback, audible feedback, and/or other feedback may optionally be provided to indicate selection, which feedback may be triggered by the depression. Indication of selection of a selection option includes any visible, audible, or other indicator that selection has occurred, such as entry of a character in a data field, performance of a function such as playing a song on a music player, opening of an application, sending an email, and so forth. Utilizing a force threshold reduces the occurrence of unintended selection, for example, due to inadvertent, careless, or erroneous touches. The force threshold, for example, addresses any force imparted on the touch-sensitive display 118 that overcomes any biasing force, compression force, moves the display an established distance, and/or any other force on the touch-sensitive display 118 prior to depression of the touch-sensitive display 118. For example, the force threshold may be established to overcome at least the biasing forces and/or the force to actuate the actuator 120 of FIG. 3. Alternatively, the force may be a force utilized in conjunction with the piezo actuator 120 of FIG. 4. The force or other action that depresses the touch-sensitive display may be detected by the actuator 120, such as described in various embodiments above, or by another type of sensor, such as the optical depression sensor described herein. Thus, the optical depression sensor acts as a force sensor. Detection of a force that results in depression of the touch-sensitive display 118 may be established based on movement, compression, or flexing of the touch-sensitive display 118 that causes an identifiable effect on an optical signal. The identifiable effect may relate to phase, amplitude, reflection including a reflection characteristic, and/or any other characteristic of the optical signal. The optical depression sensor is configured to detect the effect.

Figure 5:
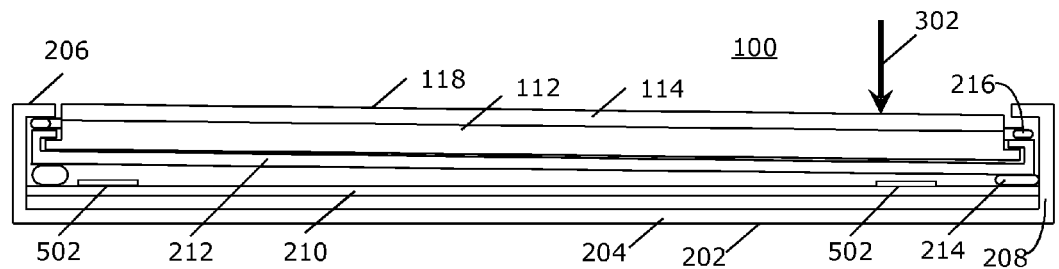
FIG. 5 is a sectional side view of an electronic device with a depression sensor in accordance with the disclosure.

A sectional side view of a portable electronic device including an optical depression sensor is shown in FIG. 5. The optical depression sensor comprises one or more optical devices 502, such as one or more optical emitters and/or receivers, also known as detectors, that detect depression of the touch-sensitive display 118 through detection of changes in reflections of light emitted toward the touch sensitive display 118. The optical receiver may be any type of receiver that receives or detects optical signals, such as an image sensor. The optical device 502 may be a paired optical emitter and an optical receiver or detector, which may be integrated into a single package. The optical device 502 may comprise more optical receivers than optical emitters. The optical depression sensor of the portable electronic device 100 illustrated in the example of FIG. 5 comprises four optical devices 502, one disposed near each corner of the device 100. For simplicity of illustration, only two optical devices 502 are shown in FIG. 5. The cross-section of FIG. 5 is taken through the centers of two of the optical devices 502 utilized in this example, which are shown disposed between the base 210 and the support tray 212. In this example, each optical device 502 includes an emitter that emits an optical signal and a receiver or detector that receives a reflection of the optical signal. The optical signal reflects off a surface that moves or deforms when the touch-sensitive display 118 is depressed. As the touch-sensitive display 118 is moved toward the base 210, when sufficient force is applied, the optical device 502 of FIG. 5 detects a change in the reflection of the optical signal. When the processor 102 detects a change or variation in the reflection that meets a threshold amount of change in reflection, depression of the touch-sensitive display 118 is detected. As shown in FIG. 5, the force 302 may cause one part of the touch-sensitive display 118 to be closer to a first optical device 502 than another part of the touch-sensitive display 118 is to a second optical device 502 because the touch-sensitive display 118 floats, i.e., moves relative to the housing. The optical signals received by the first optical device 502 may signify depression, whereas optical signals received by the second optical device 502 may not signify depression. Depression is detected when the change in reflection for any one or more of the optical devices 502 meets the threshold change in reflection. The location of the optical device 502 may optionally be utilized to determine the touch location.

Figure 6:
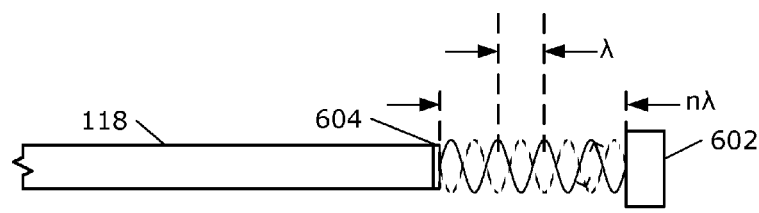
FIG. 6 is a sectional side view of a touch-sensitive display that is not depressed in accordance with the disclosure.
Figure 7:
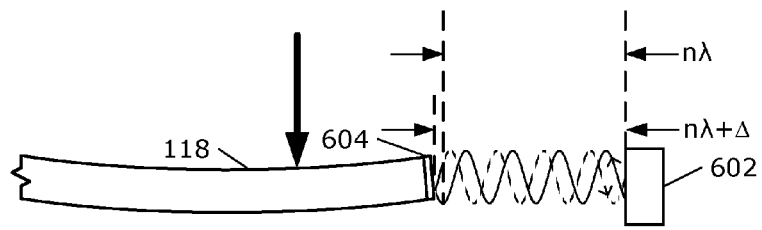
FIG. 7 is a side view of a touch-sensitive display that is depressed in accordance with the disclosure.

As shown in the cross-sectional views in the example of FIG. 6 and FIG. 7, the optical depression sensor includes an optical device 602 that emits an optical signal toward a surface, such as an external side or edge of the touch-sensitive display 118, and receives a reflection of the optical signal from the touch-sensitive display 118. The optical device 602 includes one or more devices, such as one or more optical emitters and one or more optical receivers or detectors, which may be similar to the optical device 502 of FIG. 5, and may include, for example, an infrared transmitter and receiver, an ultra-violet transmitter and receiver, a light amplification by stimulated emission of radiation (LASER) transmitter and receiver, and so forth. The touch-sensitive display 118 includes a reflective surface 604 that is shown disproportionately large for the sake of illustration. The reflective surface 604 may be the outer surface, such as a side or an edge, of the touch-sensitive-overlay 114 and/or display 112 as manufactured, a surface or an edge of the support tray 212, or a reflective coating or object applied to a surface of the touch-sensitive display 118, a polished surface of the touch-sensitive display 118, and so forth. One or more optical emitter/receivers of the optical device 602 may be directed to each of one or more surfaces 604 of the touch-sensitive display 118, e.g., each side or edge. The depression sensor may replace the mechanical actuator 120 of FIG. 2 or the piezo actuators 120 of FIG. 4. Alternatively, the mechanical actuator 120 of FIG. 2 or the piezo actuators 120 of FIG. 4 may be utilized in addition to the depression sensor.

As shown in FIG. 6, the optical device 602 emits an optical signal at a wavelength, $\lambda$. For simplicity of illustration, the optical signal is shown as a coherent optical signal having a single wavelength in FIG. 6. Alternatively, the optical signal may comprise light of any number of wavelengths, which may include a primary wavelength. When the touch-sensitive display 118 is not depressed, the distance between the optical device 602 and the reflective surface 604 is an integer multiple, n, of $\lambda$, e.g., $n\lambda$. The reflected optical signal is received by the optical device 602 after the optical signal travels a distance of $2n\lambda$. The distance may not be exactly $2n\lambda$, but may be substantially equal to $2n\lambda$ due to small manufacturing or aging variations.

When the touch-sensitive display 118 is depressed, for example, due to a force represented by the arrow in FIG. 6, the touch-sensitive display 118 is bent slightly due to the force exerted on the touch-sensitive display 118. When the touch-sensitive display 118 is depressed, the distance between the optical device 602 and the reflective surface 604 changes to $n\lambda$ plus a difference or delta, $\Delta$, due to bending or movement of the touch-sensitive display 118. $\Delta$ may be positive or negative.

Changes in the reflected optical signal are detected by the optical device 602. The change in the reflected optical signal may be a phase difference, which may be measured by a time between signal peaks, an amplitude difference, which may be partially or totally reduced, a difference in the amount of time for an optical signal emitted by the optical device 602 to reflect back to the optical device 602. For example, when touch-sensitive display 118 is depressed, the touch-sensitive display 118 is bent, which changes the reflection of optical signals emitted by the optical device 602. The change in the reflection may cause optical signals emitted from the optical device 602 to be diffused, absorbed, distorted, or otherwise changed, affecting the energy or amplitude of the optical signal, which change is detected by the optical device 602. Alternatively, the optical signal may comprise one or more pulses of one or more different durations, and a time difference in receipt of consecutive pulses of the reflected optical signal is detected when the touch-sensitive display 118 is depressed.

Depression of the touch-sensitive display 118 may prevent the reflection of light emitted by the optical device 602 from being received by the optical device 602, may cause the reflection of light to be more directly or less directly received by the optical device 602, or may cause the reflection of light to travel a greater distance before being received by the optical device 602, e.g., due to movement or deformation of the touch-sensitive display 118. Depression of the touch-sensitive display 118 may cause reflected light to be directed away from the optical device 602, e.g., upward or downward. A change in the intensity or amplitude of the reflected optical signal may be utilized to detect a depression.

Arrangements other than the optical device 602 of FIG. 6 and FIG. 7 are possible. Alternatively, the optical device 602 may emit an optical signal toward any surface that reflects at least part of the optical signal, which reflection changes when the touch-sensitive display 118 is depressed. The optical device 602 may be attached to the touch-sensitive display 118 and may emit an optical signal and receive an optical signal reflected off another part of the portable electronic device 100, such as a sidewall 208 of the housing 202. Alternatively, an optical emitter may transmit an optical signal to an optical receiver or detector, wherein one of the optical emitter and the optical receiver is attached to the touch-sensitive display 118 and the other of the optical emitter and the optical receiver is attached to another part of the portable electronic device 100, such that the emitter and receiver move relative to one another when the touch-sensitive display 118 is depressed.

Although the optical device 602 of FIG. 6 and FIG. 7 is disposed at a distance from the reflective surface 604 that is an integer multiple of the wavelength of the emitted optical signal, other arrangements are possible. The optical device 602 may be disposed at any distance and at any angle with respect to the reflective surface 604, and the distance and angle are taken into account when the reflections are analyzed.

The thresholds related to variations for an optical reflection may be modified over long periods of time to adjust for changes in the device 100 over time, e.g., weeks, months, or years.

The optical depression sensor of FIG. 6 and FIG. 7 may be disposed, for example, between the touch-sensitive display 118 and the base 210. The optical depression sensor may be disposed between other components of the portable electronic device 100. For example, the optical depression sensor may be disposed between the display 112 and the support tray 212, between the overlay 114 and the display 112, or in any other suitable location.

Figure 8:
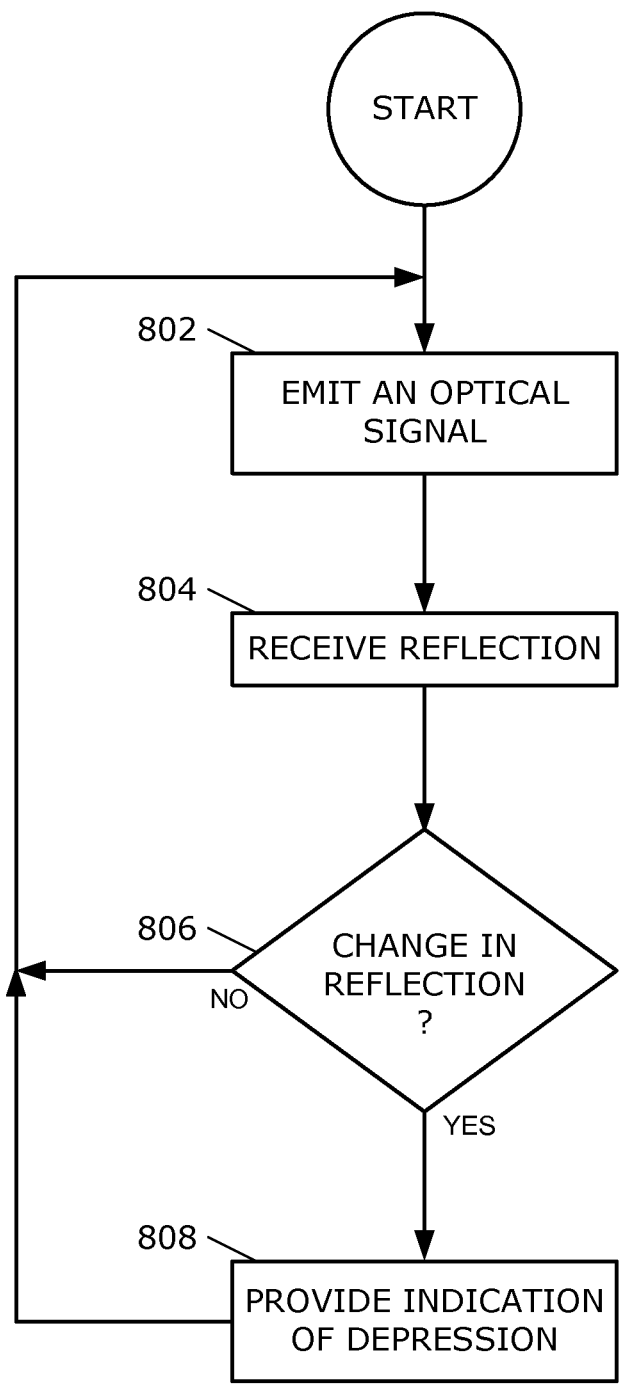
FIG. 8 is a flowchart illustrating a method of detecting depression of a touch-sensitive display in accordance with the disclosure.

A flowchart illustrating a method of detecting force exerted on, or depression of, a touch-sensitive display of a mobile device is shown in FIG. 8. The method may be carried out by software executed by, for example, the processor 102. Coding of software for carrying out such a method is within the scope of a person of ordinary skill in the art given the present description. The method may contain additional or fewer processes than shown and/or described and may be performed in a different order. Computer-readable code executable by at least one processor of the portable electronic device to perform the method may be stored in a computer-readable medium.

One or more optical signals are emitted 802 towards the touch-sensitive display 118 by the optical device 602. The optical device 602 may be enabled while the portable electronic 100 is enabled or activated, when the portable electronic device 100 is powered up, or when selection options are displayed to save energy. The optical device 602 directs the optical signals towards the touch-sensitive display 118.

The optical signals reflect off the reflective surface 604. The reflected optical signals are evaluated or analyzed when received 804 by the optical device 602 for a change in reflection 806 to determine whether the touch-sensitive display is depressed. The evaluation of the reflected optical signals may be carried out after the reflected optical signals are converted from optical signals to other signals that are more easily evaluated, such as electrical signals, e.g., by the optical device 602. The evaluation may be carried out by a processor or other suitable device configured to process electrical signals. The reflected optical signals may be evaluated for a change in reflection 806 in a number of different ways to determine whether the touch-sensitive display is depressed.

One or more baseline measurements of the reflected optical signals may be taken when the touch-sensitive display 118 is depressed and not depressed. Baseline measurements may be carried out periodically. Reflected optical signals received by the optical device 602 are compared to a relevant baseline measurement. The baseline measurements may be composite measurements, wherein one baseline is determined for all receivers of the optical device 602. Each optical receiver may have its own baseline due to relative placement of the components of the electronic device 100 and the optical device 602, different reflectivity of components of the electronic device 100, and so forth. A deviation from the baseline signifies depression when the deviation meets a threshold, such as a change in the magnitude of a reflected optical signal, a change in a time between emitting the optical signal and receiving the resulting reflected optical signal, and so forth. Exceeding the threshold is also considered meeting the threshold. Baseline measurements may be conducted over time at regular intervals, e.g., every 10 milliseconds, 10 seconds, 10 minutes and so forth, or may be carried out upon the occurrence of particular event, e.g., electronic device 100 power up, after an instruction to the user not to depress the touch-sensitive display for a period of time, and so forth. Baseline measurements may optionally be determined for different areas of the touch-sensitive display 118.

Another way of determining whether the touch-sensitive displayed is depressed 806 includes comparing a current measurement of the reflected optical signal from the optical device 602 with a previous measurement of the reflected optical signal from the optical device 602. The previous measurement may be the last measurement that was obtained or any other previous measurement. When a deviation between the current measurement and the previous measurement meets a threshold, depression is detected. Meeting a threshold includes equaling or exceeding the threshold value. The deviation may be a change in the magnitude of a reflected optical signal, a change in a time between emitting the optical signal and receiving the reflected optical signal, and so forth.

Another way of determining whether the touch-sensitive display is depressed 806 includes evaluating reflected optical signals from multiple optical receivers for variations between the reflected optical signals. The reflected optical signals from multiple optical receivers are compared to one another, for example, by comparing the reflected optical signal from each optical receiver to an average of the reflected optical signals to determine when any optical signal is sufficiently different than the average. When an optical signal is sufficiently different from the average, e.g., meeting a threshold magnitude difference, time delay, and so forth, depression is detected.

When a depression is detected 806, e.g., by detecting a change in reflection, an indication of the selection is provided 808. For example, the selection option associated with the location of the touch is processed and the indication of the selection is provided 808, and the process continues at 802.

Figure 9:
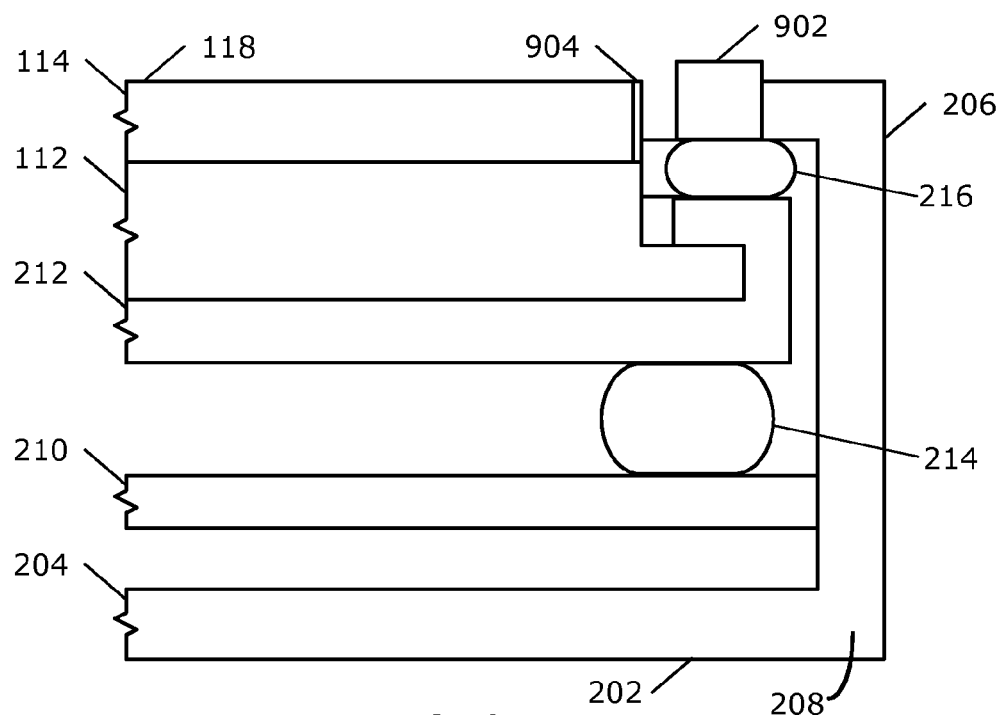
FIG. 9 is a sectional side view of a touch-sensitive display that is not depressed in accordance with the disclosure.
Figure 10:
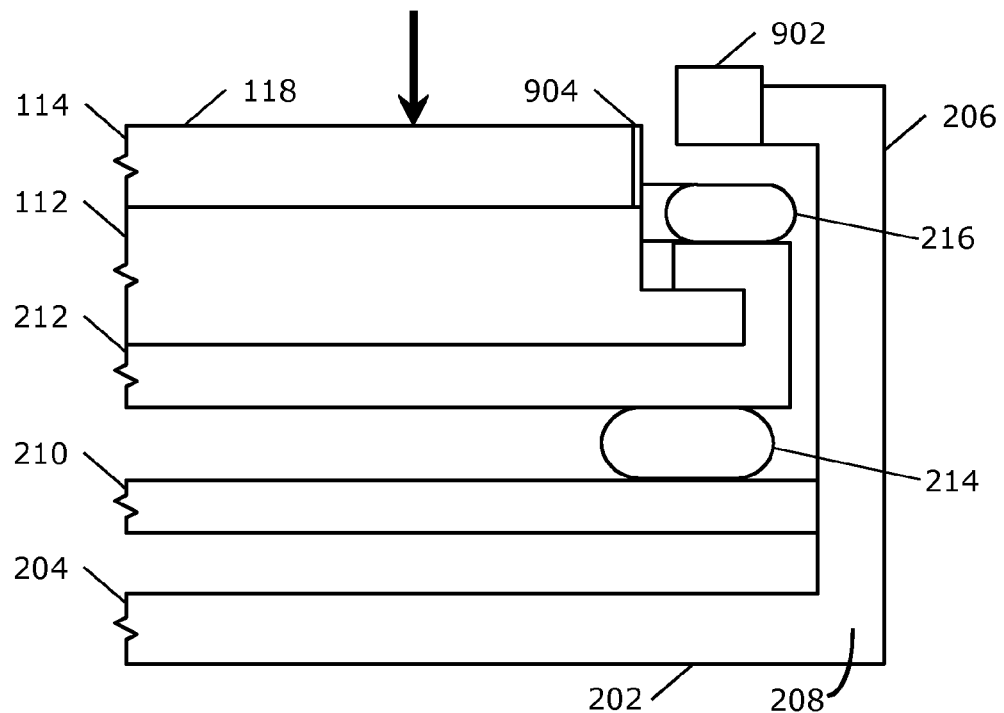
FIG. 10 is a sectional side view of a touch-sensitive display that is depressed in accordance with the disclosure.
Figure 11:
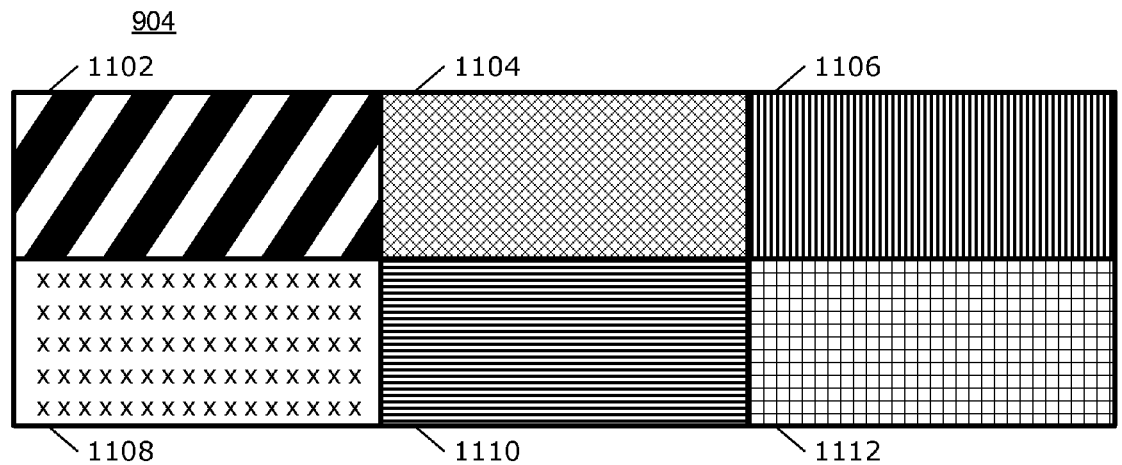
FIG. 11 illustrates an example pattern that may be used in accordance with the disclosure.

As shown in the cross-sectional views in the example of FIG. 9 and FIG. 10, the force sensor 122 includes an optical device 902 that emits an optical signal toward the touch-sensitive display 118 and receives a reflection of the optical signal from the touch-sensitive display 118. The optical device 902 includes one or more optical emitters and one or more optical detectors or receivers, which may be similar to the optical device 502 of FIG. 5 or the optical device 602 of FIG. 6, and may include, for example, an infrared transmitter/receiver, an ultra-violet transmitter/receiver, a light amplification by stimulated emission of radiation (LASER) transmitter/receiver, and so forth. The surface of the touch-sensitive display 118 includes a pattern 904, such as shown in FIG. 11. The pattern 904 may be any type of pattern that assists in the optical detection of depression or movement of the touch-sensitive display. One or more patterns may be utilized. For example, the pattern may include alternating areas that are more reflective and less-reflective, a repeated shape, such as an x or v, a pattern comprising symbols randomly located throughout the pattern area, and so forth. The pattern may be etched, screened, printed, adhesively attached via a substrate media, embedded in, or otherwise disposed on, formed on, or attached to the surface of the touch-sensitive display 118. The force sensor 122 may replace the mechanical actuator 120 of FIG. 2 or the piezo actuators 120 of FIG. 4. Alternatively, the mechanical actuator 120 of FIG. 2 or the piezo actuators 120 of FIG. 4 may be utilized in addition to the optical depression sensor of FIG. 9.

As shown in FIG. 9, the optical device 902 receives a reflection of the pattern 904 off a reflective surface 904 of the touch-sensitive display 118. When the touch-sensitive display 118 is depressed, for example, due to a force represented by the arrow in FIG. 9, the touch-sensitive display 118 moves toward the base 210 or back 204 of the housing 204. When the touch-sensitive display 118 is depressed, the reflection of the pattern 904 received by the optical device 902 changes from the reflection of the pattern 904 received by the optical device 902 when the touch-sensitive display 118 is not depressed, e.g., in a resting position.

Changes in the reflected optical signal are detected by the optical device 902. The change in the reflected optical signal may be a difference in the size or part, e.g., portion or area, of the pattern detected by the optical device 902, or other difference in reflection caused by movement of the touch-sensitive display. For example, when touch-sensitive display 118 is depressed, the touch-sensitive display 118 moves toward the base 210 or back 204 of the housing 202, which changes the part of the pattern 904 received by the optical device 902. The optical device 902 may be oriented with the touch-sensitive display such that a relatively less reflective area of the pattern 904 is reflected when the touch-sensitive display 118 is not depressed, and a relatively more reflective area of the pattern 904 is reflected when the touch-sensitive display 118 is not depressed, which will cause a reflected optical signal to have a relatively greater amplitude when the touch-sensitive display 118 is depressed.

A substantive change in the reflected optical signal is detected as a depression. For example, movement meeting a threshold distance or change in pattern by a threshold percentage may be utilized to determine whether a depression occurs.

Arrangements other than the optical device 902 of FIG. 9 and FIG. 10 are possible. Alternatively, the optical device 902 may emit an optical signal towards any surface with the pattern 904, which reflection changes with depression of the touch-sensitive display 118. The optical device 902 may be attached to the touch-sensitive display 118 and may emit an optical signal and receive an optical signal reflected from a surface with the pattern, which surface is on another part of the electronic device 100, such as a sidewall 208 of the housing 202. Alternatively, an optical emitter may transmit an optical signal to an optical receiver, wherein one of the optical emitter and the optical receiver is attached to the touch-sensitive display 118 and the other of the optical emitter and the optical receiver is attached to another part of the portable electronic device 100, such that the emitter and receiver move relative to one another when the touch-sensitive display 118 is depressed.

The optical device 902 of FIG. 9 and FIG. 10 may be disposed, for example, between the touch-sensitive display 118 and the base 210. The optical device 902 may be disposed between other components of the portable electronic device 100. For example, the optical device 902 may be disposed between the display 112 and the support tray 212, between the overlay 114 and the display 112, or in any other suitable location.

Although the optical device 902 of FIG. 9 and FIG. 10 includes an optical emitter and an optical receiver, the optical device 902 may alternatively include a receiver only. Light reflected off the surface with the pattern 904 may be from a light source such as a backlight of the touch-sensitive display, ambient light from outside the portable electronic device 100, an optical emitter separate from the optical device 902, and so forth.

As shown in FIG. 11, the pattern 904 may include several different patterns 1102, 1104, 1106, 1108, 1110, and 1112. Alternatively, the pattern 904 may comprise one or more instances of the patterns 1102, 1104, 1106, 1108, 1110, and 1112. For illustration, areas of the patterns of FIG. 11 shown in black are relatively less reflective than areas of the patterns shown in white. For example, areas that are more reflective may be darkened, etched with a matte finish, painted with a dark color, black areas, and so forth. Areas that are less reflective may be polished, brightly colored, mirrored areas, white areas, silver areas, and so forth. Other arrangements may be used. For example, any of the relatively more reflective areas may be made less reflective and less reflective areas may be made more reflective. Patterns other than those in FIG. 11 may be used.

The angled line pattern 1102 comprises areas of alternating relatively more reflective areas and relatively less reflective areas. The criss-crossed pattern 1104 comprises a relatively more reflective background with crossing lines that are relatively less reflective. The vertical pattern 1106 comprises alternating vertical lines that are relatively more reflective and relatively less reflective. The x pattern 1108 comprises a grid of relatively less reflective x's on a relatively more reflective background. The horizontal pattern 1110 comprises alternating horizontal lines that are relatively more reflective and relatively less reflective. The screen pattern 1104 comprises a relatively more reflective background with a rectangular grid of relatively less reflective lines.

The patterns 1102, 1104, 1108, and 1112 facilitate detection, by the optical device 902, of movement in any direction of a surface on which the pattern is applied. The pattern 1106 facilitates detection, by the optical device 902, of movement along the longer dimension of the pattern 1106. The pattern 1110 facilitates detection, by the optical device 902, of movement along the shorter dimension of the pattern 1110. By varying the size of areas that are relatively more reflective and relatively less reflective, the sensitivity of the optical device 902 may be varied in embodiments where the optical device 902 receives a reflection of a relatively small area and identifies depression when the reflection changes, e.g., when movement causes the reflection to move from a relatively less reflective area to a relatively more reflective area. In such embodiments, for example, the vertical pattern 1106 provide more sensitivity than the angled line pattern 1102. When the optical device 902 receives a reflective of a relatively larger area, the granularity of the relatively more reflective areas and the relatively less reflective areas may not affect the sensitivity.

Figure 12:
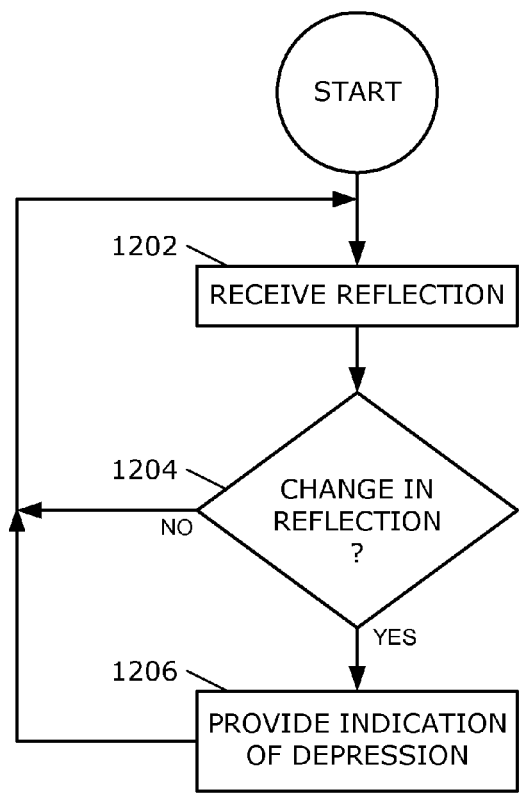
FIG. 12 is a flowchart illustrating a method of detecting depression of a touch-sensitive display in accordance with the disclosure.

A flowchart illustrating a method of detecting force exerted on, or depression of, a touch-sensitive display of a mobile device is shown in FIG. 12. The method may be carried out by software executed by, for example, the processor 102. Coding of software for carrying out such a method is within the scope of a person of ordinary skill in the art given the present description. The method may contain additional or fewer processes than shown and/or described and may be performed in a different order. Computer-readable code executable by at least one processor of the portable electronic device to perform the method may be stored in a computer-readable medium.

The optical device 902 may be enabled while the portable electronic device 100 is enabled or activated, when the portable electronic device 100 is powered up, or when selection options are displayed to save energy.

Optical signals directed toward the touch-sensitive display 118 reflect off the surface of the touch-sensitive display 118 with the pattern 904. The reflected optical signals are received 1202 and evaluated or analyzed by the optical device 902 to determine whether depression of the touch-sensitive display occurs 1204, e.g., due to change in the reflection that meets a threshold. Several ways of receiving and evaluating a reflection are described above with respect to FIG. 8, which are modifiable to determine variations in the reception of the pattern by the optical device 902.

When a depression is detected 1204, e.g., by detecting a change in reflection, an indication of the selection is provided 1206. For example, the selection option associated with the location of the touch is processed and the indication of the selection is provided 1206, and the process continues at 1202.

Through the use of one or more techniques described herein, depression of a movable touch-sensitive display may be detected without the use of strain gauges or other mechanical devices. User experience with the portable electronic device is enhanced, e.g., by more reliable selection and optional tactile feedback. Detection of force applied to the touch-sensitive display is provided with optical devices, e.g., one or more optical emitters and receivers, which optical devices may be utilized with existing touch-sensitive displays. The optical depression sensor need not be in physical contact with the touch-sensitive display. Because changes in optical reflection are analyzed, losses inherent in light transmission have negligible effect on the process.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
a touch-sensitive display having a top surface, a bottom surface, and a side reflective surface; and
an optical device positioned to emit an optical signal at the side reflective surface of the touch-sensitive display and configured to detect a reflection of the optical signal from the side reflective surface of the touch-sensitive display, and detect a force that results in depression of the top surface based on a change to the optical signal due to the reflection, wherein the optical signal and the reflection have a same wavelength when a force is applied to the top surface and when a force is not applied to the top surface, and a distance between the side reflective surface of the touch-sensitive display and the optical device is substantially equal to a multiple of the same wavelength when a force is not applied to the top surface.

2. The electronic device of claim 1, wherein the optical device comprises an optical receiver and an optical emitter.

3. The electronic device of claim 1, wherein the change comprises a change in the distance between the back surface of the touch-sensitive display and the optical device.

4. The electronic device of claim 1, wherein the sensor comprises a plurality of optical receivers.

5. The electronic device of claim 1, wherein the sensor detects a change in the reflection due to bending of the touch-sensitive display resulting from the force.

6. The electronic device of claim 1, wherein the optical device comprises a first optical receiver that receives a first reflection from a first back surface of the touch-sensitive display and a second optical receiver that receives a second reflection from a second back surface of the touch-sensitive display.

7. The electronic device of claim 1, wherein the touch-sensitive display is depressible.

8. The electronic device of claim 1, wherein the optical device is disposed near a back surface of the touch-sensitive display.

9. The electronic device of claim 1, wherein the reflection has a first characteristic when the force does not meet a threshold, and wherein the reflection has a second characteristic when the force meets the threshold.

10. The electronic device of claim 9, wherein the first characteristic is a first amplitude and the second characteristic is a second amplitude that is less than the first amplitude.

11. The electronic device of claim 1, wherein at least one of: (a) a reflective coating has been applied to the back surface to cause the optical signal to be reflected or (b) the back surface of the touch-sensitive display has been polished to cause the optical signal to be reflected.

12. An electronic device comprising:
a touch-sensitive display having a top surface, a bottom surface, and a side reflective surface;
a force sensor operable with the touch-sensitive display to detect a force exerted on the top surface and optical signals reflected from the side reflective surface of the touch-sensitive display, wherein the force sensor comprises an optical device that receives a reflection of an optical signal, wherein the reflection is affected by the force;
an optical emitter arranged to provide optical signals from which the reflection results; and
a processor configured to receive signals from the optical device and evaluate the signals to detect a variation in the optical signal after the reflection from the back surface of the touch-sensitive display, wherein the optical signal and the reflection have a same wavelength when a force is applied to the top surface and when a force is not applied to the top surface.

13. The electronic device of claim 12, wherein the optical device and the optical emitter are integrated into a single component.

14. The electronic device of claim 12, further configured to provide an indication of selection of a feature displayed on the touch-sensitive display when the variation meet a threshold.

15. A method comprising:
emitting an optical signal toward a side reflective surface of a touch-sensitive display, the touch-sensitive display having a top surface, a bottom surface, and the side reflective surface;

receiving a reflection of the optical signal reflected from the side reflective surface of the touch-sensitive display;

detecting a change in the optical signal due to the reflection, wherein the change is caused by a force exerted on the top surface that increases a distance between the touch-sensitive display and an optical detector, and the optical signal and the reflection have a same wavelength when a force is applied to the top surface and when a force is not applied to the top surface; and providing an indication of the force when the change is detected.

16. The method of claim 15, further comprising comparing the change in the optical signal to a threshold, wherein the indication is provided when the change exceeds the threshold.

* * * * *